(12) United States Patent
Moore et al.

(10) Patent No.: US 7,735,466 B1
(45) Date of Patent: Jun. 15, 2010

(54) EXHAUST BRAKE

(75) Inventors: Jacob M. Moore, Cromwell, CT (US);
Zdenek S. Meistrick, West Granby, CT (US); Neil E. Fuchs, New Hartford, CT (US); Steven Botellio, Somers, CT (US); Zhi Qiang Chu, Shangdong (CN)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 12/483,854

(22) Filed: Jun. 12, 2009

(51) Int. Cl.
*F02D 9/06* (2006.01)
(52) U.S. Cl. .................................... 123/323
(58) Field of Classification Search .................. 123/323
See application file for complete search history.

(56) References Cited

U.S. PATENT DOCUMENTS

| | | | | |
|---|---|---|---|---|
| 4,205,704 A | * | 6/1980 | Benson | 137/630.12 |
| 4,750,459 A | * | 6/1988 | Schmidt | 123/323 |
| 5,372,109 A | * | 12/1994 | Thompson et al. | 123/323 |
| 5,394,901 A | * | 3/1995 | Thompson et al. | 137/513.3 |
| 5,638,926 A | * | 6/1997 | McCrickard | 188/273 |
| 6,109,027 A | * | 8/2000 | Schaefer | 60/324 |
| 6,179,096 B1 | * | 1/2001 | Kinerson et al. | 188/154 |
| 6,981,519 B2 | * | 1/2006 | Heckt et al. | 137/599.18 |
| 7,275,367 B2 | * | 10/2007 | Tamura et al. | 60/324 |
| 7,350,502 B2 | * | 4/2008 | Meistrick et al. | 123/323 |
| 2007/0272505 A1 | * | 11/2007 | Lhote et al. | 188/273 |

* cited by examiner

*Primary Examiner*—Erick Solis
(74) *Attorney, Agent, or Firm*—David R. Yohannan; Kelley Drye & Warren LLP

(57) ABSTRACT

An exhaust brake and method of operating an exhaust brake are disclosed. The exhaust brake may have a housing having a central opening and a boss with a central bore, wherein the central bore intersects the central opening. A butterfly gate may be pivotally mounted in the central opening. The butterfly gate may have a bypass opening provided in an outer edge of the butterfly gate, and an upstream side. A dual-diameter piston may be slide-ably disposed in the central bore. The piston may have a lower end received in the bypass opening and an upper end distal from the bypass opening. One or more passages may extend between the central opening and the central bore at the upstream side of the butterfly gate, and a spring may bias the piston lower end into the bypass opening. The piston lower end may selectively unblock the bypass opening responsive to the application of static exhaust gas pressure to the piston upper end. The shape of the bypass opening and the piston lower end may be selected so that piston lower end fits closely within the bypass opening and thereby removes soot build up in the opening as a result of operation of the exhaust brake.

20 Claims, 3 Drawing Sheets

EXHAUST BRAKE

FIELD OF THE INVENTION

Embodiments of the present invention relate to apparatus and methods for controlling exhaust pressure in the exhaust system of an internal combustion engine, particularly to achieve an exhaust braking effect.

BACKGROUND OF THE INVENTION

Flow control of exhaust gas through an internal combustion engine has been used in order to provide vehicle engine braking. Engine braking may include exhaust brakes, compression release type engine brakes, bleeder type engine brakes, and/or any combination thereof. The general principle underlying such brakes is the utilization of gas compression generated by the reciprocating pistons of an engine to retard the motion of the pistons and thereby help to brake the drive train and vehicle to which the engine is connected.

Exhaust brakes are known to be useful to help brake a vehicle. Exhaust brakes may generate increased exhaust gas back pressure in an exhaust system, including an exhaust manifold, by placing a restriction in the exhaust system downstream of the exhaust manifold. Such restriction may take the form of a turbocharger, an open and closeable butterfly gate or valve, or any other means of partially or fully blocking the exhaust system.

By increasing the pressure in the exhaust manifold, an exhaust brake also increases the residual cylinder pressure in the engine cylinders at the end of the exhaust stroke. Increased pressure in the cylinders, in turn, increases the resistance encountered by the pistons on their subsequent up-strokes (i.e., compression and exhaust strokes). Increased resistance for the pistons results in braking the vehicle drive train which may be connected to the pistons through a crank shaft.

In some known vehicle braking systems, exhaust brakes have been provided such that the restriction in the exhaust system is either fully in place or fully out of place. These exhaust brakes may produce levels of braking which are proportional to the speed of the engine (RPM) at the time of exhaust braking. The faster the engine speed, the greater the pressure of the gas in the exhaust manifold and cylinders. The higher pressure results in increased resistance to the up-stroke of the piston in the cylinder and therefore, increased braking.

Because the exhaust system and engine cannot withstand unlimited pressure levels, many systems include exhaust brake restrictions that are designed such that their operation at a rated maximum engine speed will not produce unacceptably high pressures in the exhaust system and/or engine that exceed a pressure limit. At engine speeds below the rated maximum engine speed, however, these exhaust brake restrictions may produce pressures that are lower than necessary. As a result, less than optimum braking may occur below the rated maximum engine speed.

In some known vehicle braking systems, exhaust brakes have been provided with a butterfly gate having a fixed-sized opening, or orifice, formed in the gate. When the gate is closed, the orifice provides an exhaust gas flowpath through the gate. The orifice may be sized such that at the rated maximum engine speed, the orifice permits a sufficient release of pressure from the upstream side of the butterfly gate that the exhaust pressure does not exceed the pressure limit for the engine. FIG. 1 of U.S. Pat. No. 7,350,502, which is hereby incorporated by reference, is a graph illustrating retarding power and back pressure versus engine speed (RPM) for an exhaust brake system having a valve and an orifice. The graph also illustrates an exhaust pressure limit and a targeted retarding power for a particular engine over a range of engine speeds.

In some known vehicle braking systems, exhaust brakes have been provided with variable restriction or bypass. Some variable restriction exhaust brake systems may include a spring loaded pressure-relief valve operable to admit flow of exhaust gases along a bypass flowpath only when a prescribed back pressure is reached. One such exhaust brake is disclosed in U.S. Pat. No. 4,750,459, which is incorporated herein by reference. In such exhaust brakes, when the prescribed back pressure is reached, the pressure overcomes the force of the bypass valve spring and opens the valve to relieve the pressure. When the valve opens, however, the flow of the gas through the valve may create a localized dynamic pressure drop near the valve. This pressure drop may cause the valve to close prematurely, or to rapidly close and then reopen. As a result the desired level of exhaust back pressure may not be easily maintained, and the desired level of braking may not be achieved. Accordingly, it may be advantageous to design an exhaust brake with a bypass that operates more in response to static exhaust pressure than to dynamic exhaust pressure.

Exhaust brakes are often used in diesel engine vehicles. Diesel exhaust tends to have high particulate matter content, referred to as soot. Over a prolonged period, diesel soot may adhere to and build up on the parts of an exhaust brake. As noted above, some exhaust brakes may include a bypass valve or mechanism with a bypass opening of a predetermined size designed to provide a desired level of exhaust backpressure at the highest rated engine speed. If soot builds up on such a selectively sized bypass opening, the opening may become sufficient blocked as to cause the exhaust backpressure to exceed that which is desired at the maximum rated engine speed. This can cause excessive and unintended exhaust braking, and potentially cause damage to the engine, exhaust system, and/or exhaust brake. Accordingly, it may be advantageous to design an exhaust brake in a manner that reduces the tendency of soot to build up on or in a bypass passage.

Embodiments of the present invention may provide apparatus and methods for controlling exhaust pressure in an internal combustion engine. Some embodiments of the present invention, but not necessarily all, may control exhaust gas back pressure independent of, or with reduced influence of, the effect of dynamic exhaust pressure on an exhaust brake bypass mechanism. Some embodiments of the present invention may also reduce the tendency of soot to build up on and/or block an exhaust brake bypass mechanism. These and other advantages of embodiments of the invention are set forth, in part, in the description which follows and, in part, will be apparent to one of ordinary skill in the art from the description and/or from the practice of the invention.

SUMMARY OF THE INVENTION

Responsive to the foregoing challenges, Applicants have developed an innovative exhaust brake comprising: a housing having a central opening and a boss with a central bore, wherein the central bore intersects the central opening; a butterfly gate pivotally mounted in the central opening, said butterfly gate having a bypass opening provided in an outer edge of the butterfly gate, and having an upstream side; a piston slide-ably disposed in the central bore, the piston having a lower end received in the bypass opening and an upper end disposed in the central bore distal from the bypass opening; one or more passages extending between the central opening and the central bore at the upstream side of the butterfly gate; and a spring biasing the piston lower end into the bypass opening.

Applicants have further developed an innovative method of controlling exhaust pressure in an engine with an exhaust brake having a butterfly gate with a bypass opening provided in an outer edge of the butterfly gate and a slide-able piston having a lower end adapted to selectively block said bypass opening and having an upper end adapted to receive static exhaust gas pressure, said method comprising the steps of: closing the butterfly gate; blocking the bypass opening in the butterfly gate with the lower end of the piston as a result of closing the butterfly gate; generating static exhaust gas pressure in the exhaust brake responsive to closing the butterfly gate and blocking the bypass opening; applying the static exhaust gas pressure to the upper end of the piston; and unblocking the bypass opening in the butterfly gate by sliding the lower end of the piston out of at least a portion of the bypass opening responsive to the application of the static exhaust gas pressure to the upper end of the piston.

Applicants have still further developed an innovative exhaust brake comprising: a housing having a central opening and a boss with a central bore, wherein the central bore intersects the central opening; a means for selectively blocking the central opening, said means for selectively blocking the central opening having a bypass opening provided therein, and having an upstream side; a means for selectively blocking the bypass opening, said means for selectively blocking the bypass opening having an upper end disposed in the central bore distal from the bypass opening; one or more passages extending between the central opening and the central bore at the upstream side of the means for selectively blocking the central opening; and a means for biasing the means for selectively blocking the bypass opening into the bypass opening.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF PREFERRED EMBODIMENTS OF THE INVENTION

Figure 1:
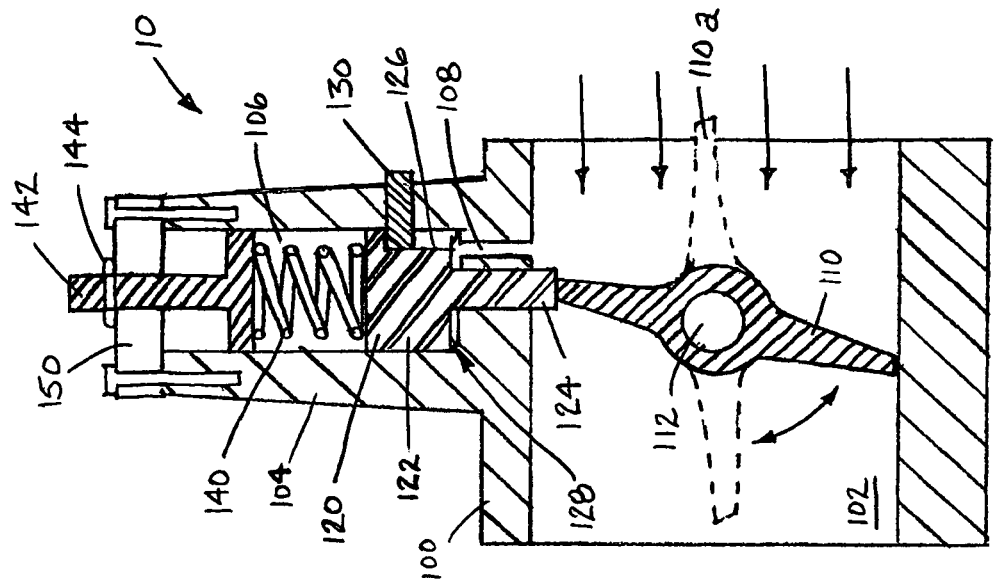
FIG. 1 is a schematic sectional side view of an exhaust brake according to a first embodiment of the present invention with the bypass opening blocked.
Figure 3:
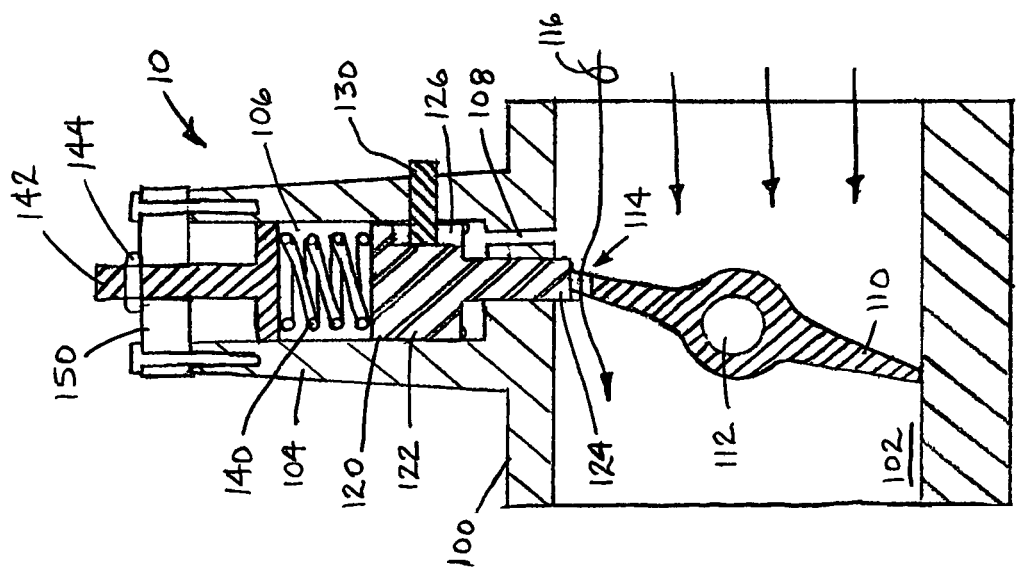
FIG. 3 is a schematic sectional side view of the exhaust brake shown in FIGS. 1 and 2 with the bypass opening unblocked.
Figure 2:
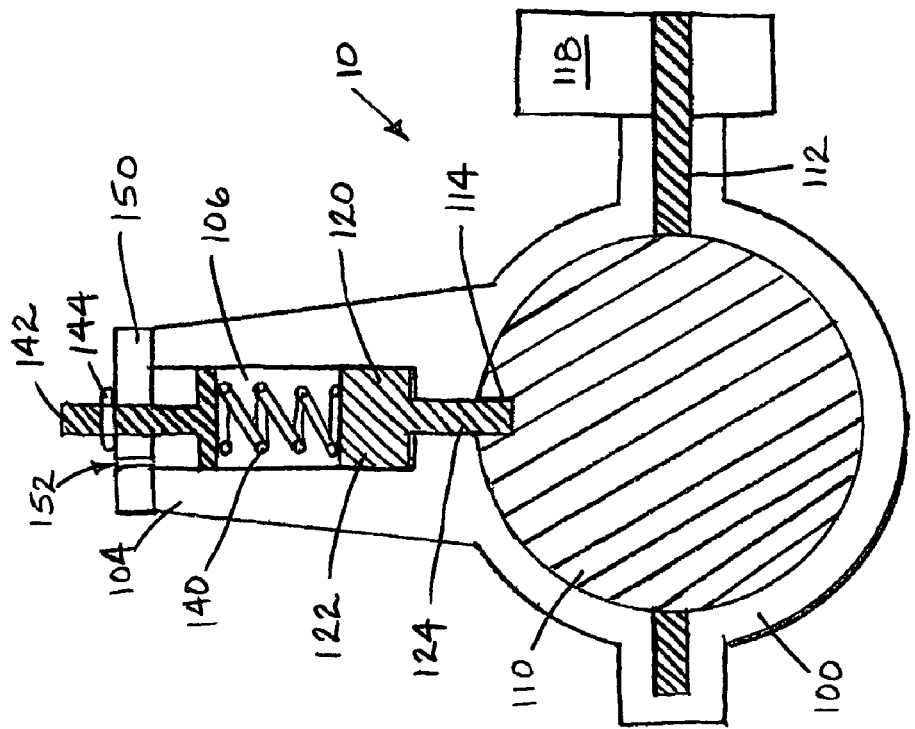
FIG. 2 is a schematic sectional end on view of the exhaust brake shown in FIG. 1 with the bypass opening blocked.
Figure 4:
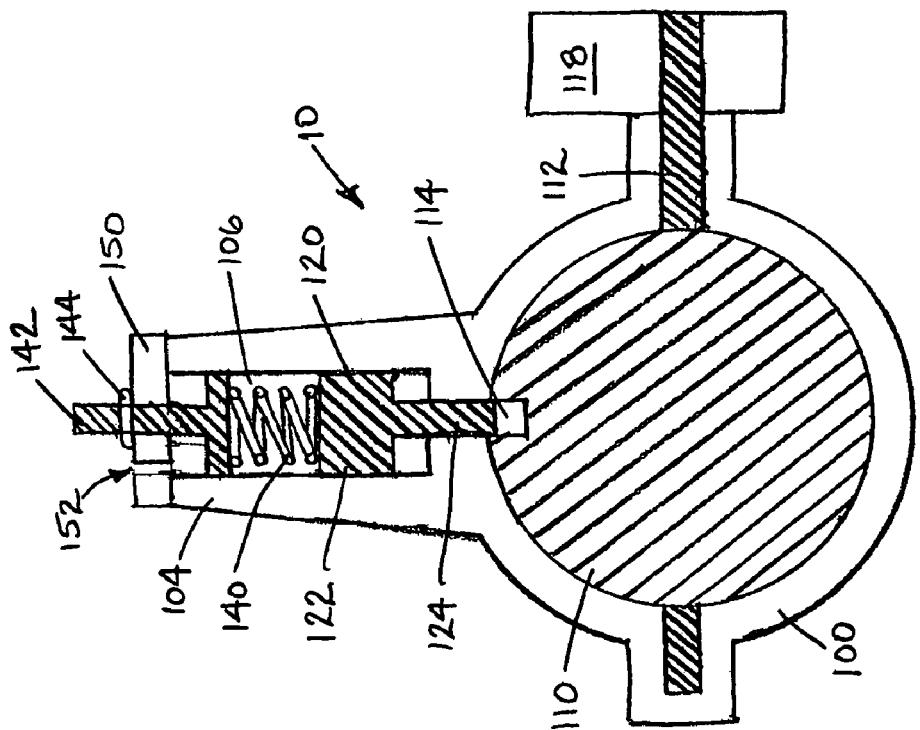
FIG. 4 is a schematic sectional end on view of the exhaust brake shown in FIGS. 1-3 with the bypass opening unblocked.

Reference will now be made in detail to embodiments of the present invention, examples of which are illustrated in the accompanying drawings. With reference to FIGS. 1 and 2, an exhaust brake 10 may be disposed in a vehicle exhaust system downstream of an exhaust manifold. The exhaust brake 10 may have a housing 100 in which a central opening 102 is provided. A butterfly gate 110 may be pivotally mounted on an axel 112 in the central opening 102. The butterfly gate 110 may be sized such that when it pivots counter-clockwise from an open position 110a (shown in phantom) to a closed position (as shown), the butterfly gate 110 substantially or completely blocks the flow of exhaust gas from right to left through the central opening 102. The butterfly gate 110 may include a bypass opening 114 along the outer perimeter of the gate, preferably at a location distal from the axel 112. In the embodiment shown in FIGS. 1-4, the bypass opening may have a square notch shape provided in the edge of the butterfly gate. A butterfly actuator 118, of any type known in the art, may be used to pivot the butterfly gate 110 between its closed position (shown in FIG. 1) and its open position 110a (shown in FIG. 1 in phantom).

The housing 100 may also have a boss 104 extending from the generally cylindrically shaped main body portion of the housing. The boss 104 may have a central cylindrical bore 106 extending into it. The bore 106 may intersect the central opening 102 and may have a greater diameter at the end distal from the central opening and a smaller diameter at the end which intersects the central opening. One or more passages 108 may extend between the central opening 102 and the greater diameter portion of the bore 106 upstream of the butterfly gate 110.

A duel-diameter piston 120 may be slide-ably disposed in the bore 106. The piston 120 may have a piston upper end 122 which is relatively greater in diameter than the piston lower end 124. The piston lower end 124 may have a shape which is adapted to selectively block the bypass opening 114 provided in the butterfly gate 110. As shown in FIGS. 1-4, the piston lower end 124 terminates in a right-cylinder shape which mates with the square notch shape of the bypass opening 114. The upper piston end 122 may form a seal with the bore 106 such that exhaust gas pressure leakage past the upper piston end is insignificant.

A slot 126 may be provided in the piston upper end 122. The slot 126 may be sized to receive a pin 130 which extends through the wall of the boss 104 into the slot. The pin 130 may be fixed in position by screw threads or other means relative to the piston 120 such that the piston is able to slide freely along the axis of the bore 106, but is restrained from rotating within the bore. The placement of the pin 130 and the length and shape of the slot 126 may also be used to restrict the amount of movement of the piston 120 along the axis of the bore 106.

The piston 120 may also have an annular ring 128 on the face of the piston that is proximal to the end wall of the larger diameter portion of the bore 106. The annular ring 128 may create a small space between the end wall of the larger diameter portion of the bore 106 and the face of the piston 120 proximal to such end wall. The resulting small space may permit exhaust gas which enters the bore 106 from the one or more passages 108 to act on a majority of the surface area of the face of the piston 120 proximal to the end wall of the bore.

One or more springs 140 may be provided in the bore 106 between the piston 120 and an adjustable stop 142. The adjustable stop 142 may extend through a cap 150 provided with one or more air vents 152. The position of the stop 142 along the axis of the bore 106 may be adjusted by selectively tightening and un-tightening a nut 144. The cap 150 may be fixed to the end of the boss 104 by any means, such as one or more screws. The stop 142 may have a diameter such that it permits air to easily leak past it into the upper portion of the bore 106 and through the one or more vents 152. As a result, movement of the piston 120 along the axis of the bore 106 is not restrained by air pressure in the upper portion of the bore.

The one or more springs 140 may bias the piston 120 into the bore 106 such that the piston lower end 124 completely blocks the bypass opening 114 when the butterfly gate 110 is closed and there is a relatively low level of static exhaust gas pressure in the one or more passages 108. Preferably, the one or more springs 140 are selected to have a relatively constant spring load or bias force that acts on the piston 120 over the expected full travel path of the piston. Alternatively, the one or more springs 140 may provide a progressively increasing level of bias force on the piston 120 as the piston is pushed further out of the bore 106 by the static exhaust pressure provided in the one or more passages 108.

Operation of the exhaust brake 10 is described with reference to FIGS. 1-4. With reference to FIG. 1, the butterfly gate 110 may be rotated from an open position 110a (phantom) to a closed position as shown. As the butterfly gate 110 rotates to close, the lower piston end 124 is received into the bypass opening 114. The lower piston end 124 and the bypass opening may fit together closely so that soot is scraped out of the bypass opening 114 each time the butterfly gate closes, which prevents soot build-up in the bypass opening. The scraping away of soot in the bypass opening 114 may also occur from the lower piston end 124 moving vertically in and out of the bypass opening as described below. At this point, the bypass opening 114 is blocked by the lower piston end 124 and the central opening 102 is blocked by the butterfly gate 110. As a result, static exhaust gas pressure develops on the upstream side of the butterfly gate 110, which pressure is transferred through the one or more passages 108 into the central bore 106. This static exhaust gas pressure may act on the piston upper end 122 and force the piston 120 upward against the bias of the one or more springs 140. The piston 120 is restrained from rotating by the pin 130 which engages the slot 126 in the piston upper end 122. As the piston 120 moves upward, the piston lower end 124 is drawn out of the bypass opening 114 and exhaust gas bypass flow 116 (FIG. 2) may pass through the bypass opening 114.

By predetermined selection of the one or more springs 140, selective setting of the position of the adjustable stop 142 and predetermined sizing of the surface area of the face of the upper piston end 122 that is proximal to the inner end of the bore 106, the level of exhaust back pressure may be maintained at a predetermined level, which is preferably near the level of the exhaust pressure limit of the engine at high engine speeds so as to optimize the engine retarding power.

Figure 6:
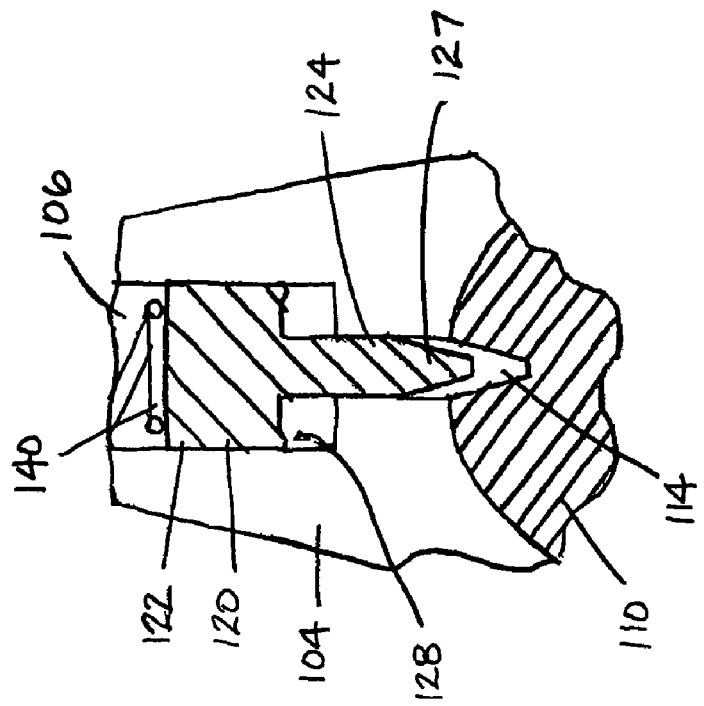
FIG. 6 is a schematic sectional view of a portion of an exhaust brake according to a third embodiment of the present invention with the bypass opening unblocked.
Figure 5:
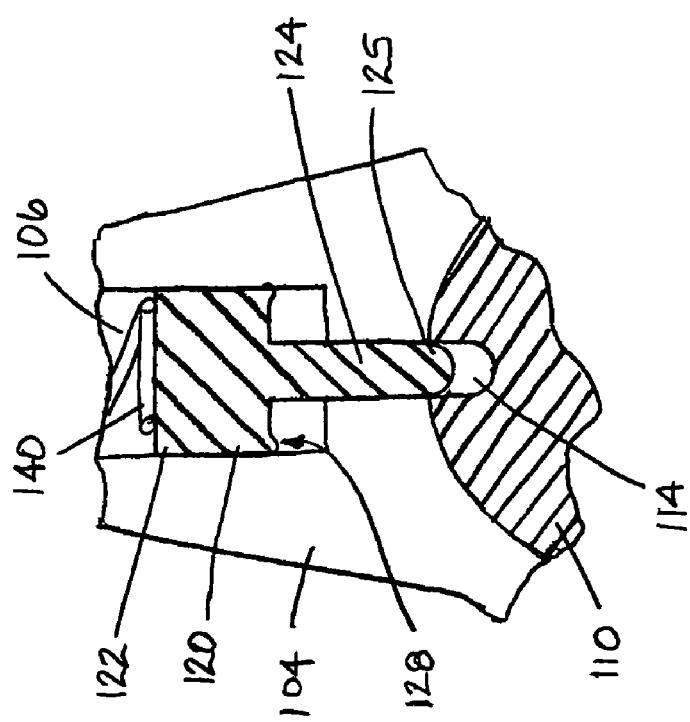
FIG. 5 is a schematic sectional view of a portion of an exhaust brake according to a second embodiment of the present invention with the bypass opening unblocked.

Alternative embodiments of the present invention may incorporate a piston lower end 124 and a mating bypass opening 114 of different shapes. For example, in FIG. 5, a lower piston end 124 with a rounded or spherical shape 125 and a bypass opening having a mating rounded or spherical shape are shown. In FIG. 6, a lower piston end 124 with a frusto-conical, tapered, or wedge shape 127 and a bypass opening having a mating frusto-conical, tapered, or wedge shape are shown.

It will be apparent to those skilled in the art that variations and modifications of the present invention can be made without departing from the scope or spirit of the invention. Thus, it is intended that the present invention cover all such modifications and variations of the invention, provided they come within the scope of the appended claims and their equivalents.

What is claimed is:

1. A method of controlling exhaust pressure in an engine with an exhaust brake having a butterfly gate with a bypass opening provided in an outer edge of the butterfly gate and a slide-able piston having a lower end adapted to selectively block said bypass opening and having an upper end adapted to receive static exhaust gas pressure, said method comprising the steps of:

closing the butterfly gate;

blocking the bypass opening in the butterfly gate with the lower end of the piston as a result of closing the butterfly gate;

generating static exhaust gas pressure in the exhaust brake responsive to closing the butterfly gate and blocking the bypass opening;

applying the static exhaust gas pressure to the upper end of the piston; and unblocking the bypass opening in the butterfly gate by sliding the lower end of the piston out of at least a portion of the bypass opening responsive to the application of the static exhaust gas pressure to the upper end of the piston.

2. The method of claim 1, further comprising the step of biasing the upper end of the piston towards the static exhaust gas pressure.

3. The method of claim 2, further comprising the step of restraining the upper end of the piston from rotating relative to the exhaust brake.

4. An exhaust brake comprising:

a housing having a central opening and a boss with a central bore, wherein the central bore intersects the central opening;

a butterfly gate pivotally mounted in the central opening, said butterfly gate having a bypass opening provided in an outer edge of the butterfly gate, and having an upstream side;

a piston slide-ably disposed in the central bore, the piston having a lower end received in the bypass opening and an upper end disposed in the central bore distal from the bypass opening;

one or more passages extending between the central opening and the central bore at the upstream side of the butterfly gate; and a spring biasing the piston lower end into the bypass opening.

5. The exhaust brake of claim 4, further comprising:

a slot provided in the piston upper end; and a pin extending through the boss and into the slot.

6. The exhaust brake of claim 5, further comprising:

an annular ring provided on an end face of the piston upper end.

7. The exhaust brake of claim 6, further comprising:

an adjustable stop disposed in the central bore, wherein the spring is disposed between the adjustable stop and the piston upper end.

8. The exhaust brake of claim 7, wherein the piston upper end has a diameter greater than the piston lower end.

9. The exhaust brake of claim 4, wherein the piston lower end has a right-cylinder shape and the bypass opening has a mating square notch shape.

10. The exhaust brake of claim 4, wherein the piston lower end has a spherical shape and the bypass opening has a mating spherical shape.

11. The exhaust brake of claim 4, wherein the piston lower end has a frusto-conical shape and the bypass opening has a mating frusto-conical shape.

12. The exhaust brake of claim 4, wherein the piston lower end has a wedge shape and the bypass opening has a mating wedge shape.

13. The exhaust brake of claim 4, further comprising:
an annular ring provided on an end face of the piston upper end.

14. The exhaust brake of claim 4, further comprising:
an adjustable stop disposed in the central bore, wherein the spring is disposed between the adjustable stop and the piston upper end.

15. The exhaust brake of claim 4, wherein the piston upper end has a diameter greater than the piston lower end.

16. An exhaust brake comprising:
a housing having a central opening and a boss with a central bore, wherein the central bore intersects the central opening;
a means for selectively blocking the central opening, said means for selectively blocking the central opening having a bypass opening provided therein, and having an upstream side;
a means for selectively blocking the bypass opening, said means for selectively blocking the bypass opening having an upper end disposed in the central bore distal from the bypass opening;
one or more passages extending between the central opening and the central bore at the upstream side of the means for selectively blocking the central opening; and
a means for biasing the means for selectively blocking the bypass opening into the bypass opening.

17. The exhaust brake of claim 16, wherein the means for selectively blocking the bypass opening has a right-cylinder shape and the bypass opening has a mating square notch shape.

18. The exhaust brake of claim 16, wherein the means for selectively blocking the bypass opening has a spherical shape and the bypass opening has a mating spherical shape.

19. The exhaust brake of claim 16, wherein the means for selectively blocking the bypass opening has a frusto-conical shape and the bypass opening has a mating frusto-conical shape.

20. The exhaust brake of claim 16, wherein the means for selectively blocking the bypass opening has a wedge shape and the bypass opening has a mating wedge shape.

* * * * *